April 6, 1965 P. L. OSWEILER 3,177,019
PIPE JOINT CONSTRUCTION
Filed Aug. 3, 1961 2 Sheets-Sheet 1
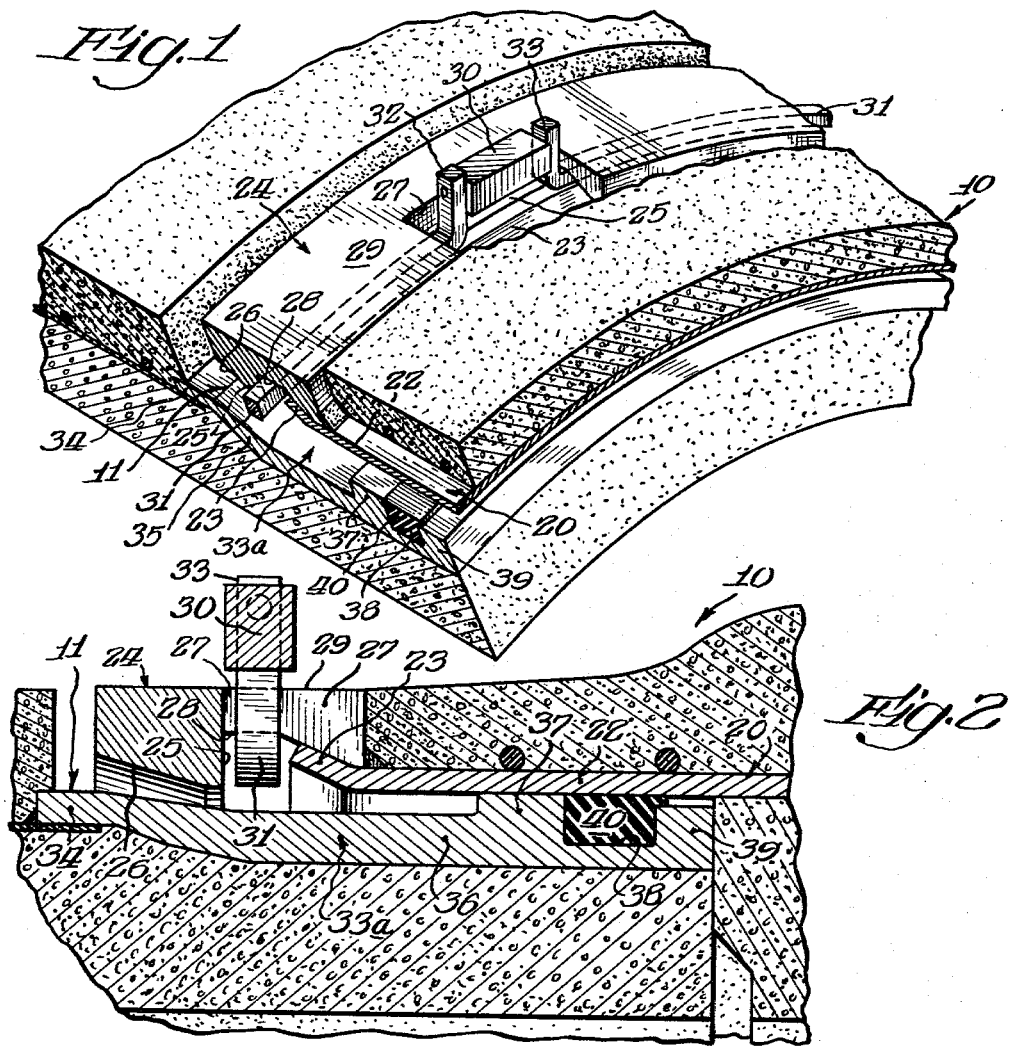
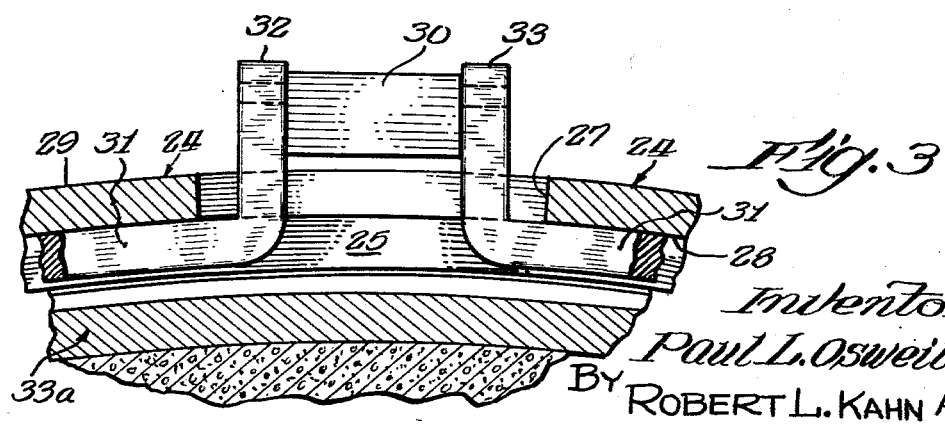
Inventor:
Paul L. Osweiler
By Robert L. Kahn Atty April 6, 1965 P. L. OSWEILER 3,177,019
PIPE JOINT CONSTRUCTION
Filed Aug. 3, 1961 2 Sheets-Sheet 2
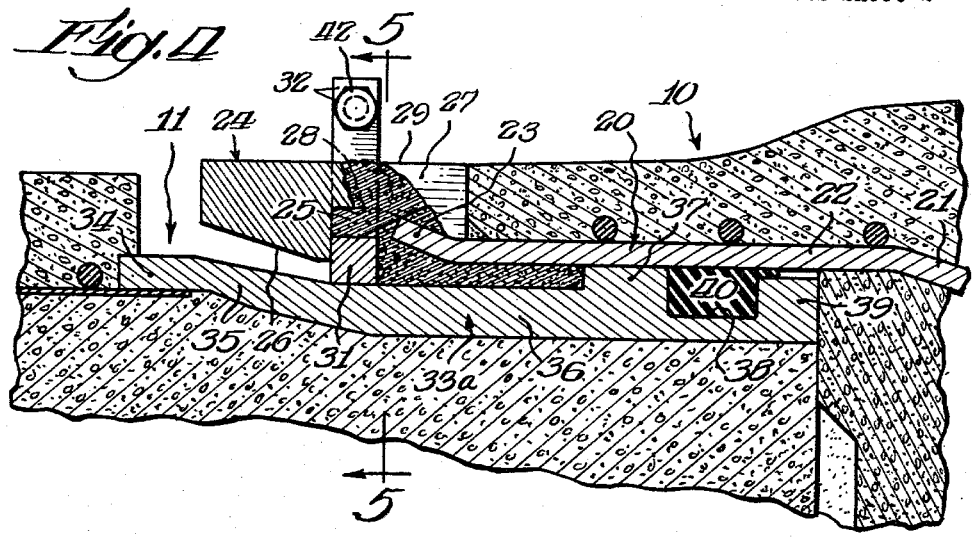
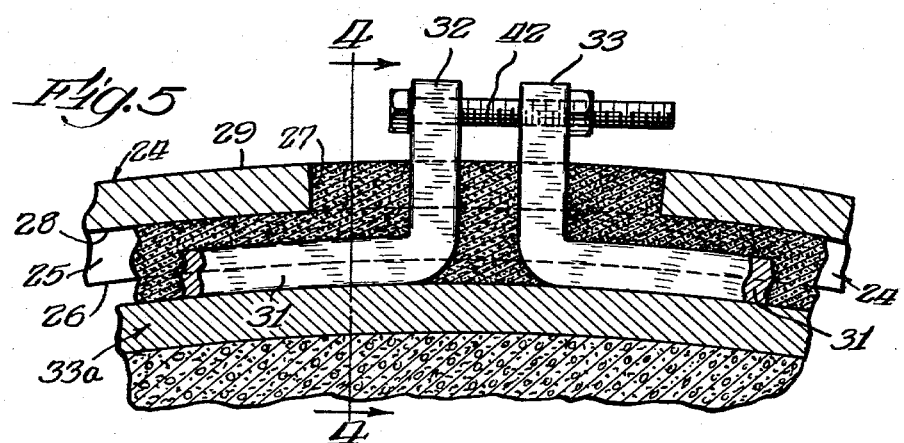
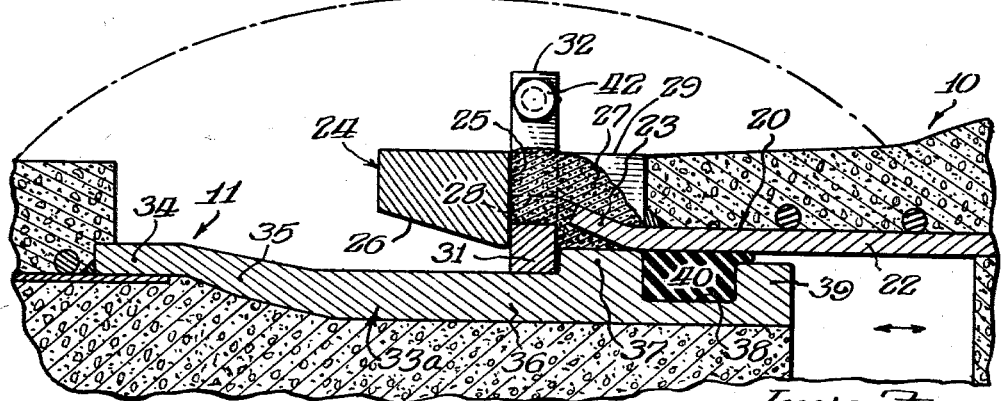
Inventor:
Paul L. Osweiler
BY ROBERT L. KAHN ATTY

United States Patent Office 3,177,019
Patented Apr. 6, 1965

3,177,019
PIPE JOINT CONSTRUCTION
Paul L. Osweiler, Dayton, Ohio, assignor to Price Brothers Company, Dayton, Ohio, a corporation of Michigan
Filed Aug. 3, 1961, Ser. No. 128,992
1 Claim. (Cl. 285—233)

This invention relates to a pipe joint construction and more particularly to a joint construction for concrete or steel pipe used in large sizes for water, sewage and the like. Pipes to which this invention relate are generally laid in ground and may be provided in diameters ranging from as little as about 16 inches or so to as much as 10 or more feet.

Pipes referred to above are manufactured in lengths of the order of 16 or more feet in length and are laid in trenches to make a pipe line. Pipe lines consisting of such pipe lengths may extend for miles. As a rule, the specifications for such pipe lines include as an important factor, the permissible leakage of the pipe system. Substantially all leakage in such a pipe system occurs at the pipe joints. Excessive leakage from pipe joints indicates a defect which is very expensive to remedy. It is of the utmost importance that pipe joints be designed so that assembled pipe sections will have tight joints that will remain tight when assembled under normal field conditions. The field conditions at bends, T's reducers and valves, may be such that reaction blocks will not be suitable to resist thrust. It is necessary to provide other means of absorbing the thrust by tying several pipe lengths together to insure safe operating conditions.

The invention hereinafter disclosed provides a simple, effective construction which has sufficient flexibility to withstand abuse in connection with the laying of the pipe and the assembly of the joint, as well as subsequent use thereof. In this connection, it might be observed that some joints fail not because of improper assembly, but because the joint construction is inherently incapable of withstanding longitudinal thrust, maximum thrust being reached by transient pressure peaks of fluid within the pipe, such pressure peaks having values greater than the maximum pressures which the pipe and the joint are normally designed to accommodate. When pipe lengths are assembled to form a pipe line, at elbows, reducers, valves, etc., the pipe sections at the joints may tend to open when pressure peaks occur. Thus movement in a pipe line can be expected under certain conditions. When two adjacent lengths of pipe tend to separate at the joint, there can be leakage at the joint unless the joint construction is such as to restrain or limit the movement. The construction embodying the present invention is suited to restrain such tendencies to open at the joints.

The present invention provides a joint having telescoping bell and spigot ends. The joint includes a steel ring which functions as a locking element. The joint construction as a whole includes the usual gasket ring for insuring a liquid tight seal. An important feature of the present invention resides in the structural details whereby substantial pipe response to internal pressure tending to open a joint results in steel to steel contact resisting further pipe movement. This occurs without impairing the liquid tight gasket sealing action. An advantage of this construction resides in the fact that some pipe movement is tolerated. This tight joint will be provided even though a grout filling step is omitted by accident. The joint construction will hold tight until steel fails in tension or due to bending. Thus a joint will remain water tight until it fails completely under extreme pressure.

For an understanding of the invention, reference will now be made to the drawings, in connection with which a description of the invention will be given.

FIGURE 1 is a perspective view of a part of the joint.
FIGURE 2 is a transverse sectional detail of the joint.
FIGURE 3 is an enlarged detail of the ends of the steel ring.
FIGURE 4 is a section on line 4—4 of FIGURE 5.
FIGURE 5 is a section on line 5—5 of FIGURE 4.
FIGURE 6 is a section generally similar to FIGURE 4 but showing the assembled joint response to excessive liquid pressure while still functioning.

A length of pipe embodying the invention will have a bell end generally indicated by 10 and a spigot end similar to that indicated by 11. The pipe itself may be of steel, concrete or reinforced and prestressed concrete. The pipe may include circumferential or longitudinal prestressing wires or may have both in accordance with well known practice. Firmly anchored in the pipe is bell construction generally indicated by 20. Bell 20 has inner end portion 21 generally sloping toward the center of the pipe and straight portion 22 which in the complete pipe will form a cylindrical member having a length along the axis of the pipe suitable for the requirements of the joint. As an example, this can be about three inches long. Bell 20 continues to outwardly tapering bell portion 23 to the outside of which is welded steel ring 24. Steel ring 24 has inwardly extending shoulder 25 and outer bell portion 26. Ring 24 extends continuously around the pipe end and is provided at one portion thereof with slot 27 from inside annular surface 28 through the ring to outside surface 29.

Disposed within bell ring 24 and normally contracting away from surface 28 of bell ring 24 is steel ring 31 having a generally rectangular section. Steel ring 31 is continuous except for ends 32 and 33 bent outwardly and extending through slot 27 of the bell ring. Ends 32 and 33 of the steel ring are long enough to extend beyond bell ring 24 so that ends 32 and 33 are available for wedging by block 30. When block 30 is between ends 32 and 33, ring 31 is expanded so that it bears against surface 28 of ring 24.

Spigot end 11 is provided by annular steel spigot member generally indicated by 33a. Spigot member 33a has anchor portion 34 suitably anchored in the pipe. Spigot member 33a has portion 35 wihch tapers inwardly toward the axis of the pipe and finally levels out at body portion 36. Body portion 36 is cylindrical and has outwardly extending flange 37. Continuing beyond flange 37, spigot member 33a has groove 38 and shoulder portion 39. Preferably, shoulder portion 39 has an outer diameter somewhat less than that of shoulder flange 37. Within groove 38, there is disposed gasket 40 of flexible material such as rubber. This gasket may have any desired shape and as illustrated in the drawing, it is compressed so that it fills the generally rectangular groove. The gasket may be applied in conventional fashion by snapping the gasket in position. Preferably just prior to the assembly of the joint, the gasket is lubricated with vegetable soap or similar material. A pipe length is oriented so that slot 27 at the bell end will always be on top. It is necessary that the inside diameter of ring 31 when expanded to lie in the annular groove of bell ring 24 be somewhat larger than the outside diameter of flange 37 for assembly.

The joint is assembled in conventional fashion. As a rule, a length of pipe has the spigot end inserted into the bell end of a length of pipe which has already been laid. The bell shaped surfaces permit the spigot to enter the bell in spite of imperfect alinement. After the new length of pipe is laid so that the spigot is fully inserted into the bell, as illustrated in the drawing, block 30 is removed so that the spring ring contracts. This may be constructed by bolt means 42 passing through holes in parts 32 and 33 and including a nut as part thereof. Grout, cement, liquid plastic, or any other suitable filler is poured through slot 27, at the top of the joint. The grout or cement poured through the slot will flow around the annular region and fill the space within which the spring ring lies.

The assembled joint can now be covered with concrete, grout or the like to form a continuous coating from one pipe length to another. FIGURE 6 shows a completed joint with the outer covering of concrete suggested by a dotted line for clarity. Under pressure inside the pipe, the tendency of adjacent pipe lengths is to separate at a joint. This will result in compression on some of the filler about the spring ring and tension on other parts of the filler. Even normal use of the pipe system with pressure may result in some separation of adjacent pipe lengths at joints. This will not result in permanent damage. However, extreme pressure may crumble and destroy the filler about the spring ring. Maximum separation of the bell and spigot is shown in FIGURE 6. This shows shoulder 37 against ring 31 which in turn bears against shoulder 25 of the outer bell ring. In this position, steel against steel resists further opening movement. Also gasket 40 is still between cylindrical steel surfaces for effective gasket action. Shearing of ring 31 or other failure of ring 31 must occur before complete joint separation can occur. Until then, the joint remains as tight as ever.

Instead of having a normally contracted ring, it is possible to have a normally expanded ring. In such case, means for contracting and clamping the ring will have to be provided. Such means may include bolt means 42 passing through arms 32 and 33 with nuts against the inside faces of arms 32 and 33.

In a practical joint, the length of spigot portion 36 to the very end at shoulder 39 was substantially four inches. The length of cylindrical portion 22 was three inches and the length of the bell end from the end face of the concrete adjacent shoulder 39 to wall 25 was substantially four inches. Beyond wall 25, outer bell ring 24 extended another inch. The steel ring was three-eighths inches square. A 30 inch pipe having a joint as described, successfully withstood pressures of 550 p.s.i. without failing.

Even if workmen fail to pour grout or filler into the joint, it will still hold up. Grout or other material is desirable to keep the metal from rusting as well as stiffen some parts. Instead of grout, material like molten lead, or plastic, can be poured in. It is possible to provide a soft metal ring around body portion 36 between flange 37 and ring 31. The soft metal can be aluminum or lead and will provide better resistance to compression in case a pipe joint tends to pull out as shown in FIGURE 6.

An important practical advantage of the new joint construction is that it does not require any major change in pipe manufacture. The bell and spigot parts are attached to a pipe in conventional fashion. The joint is assembled in conventional fashion.

What is claimed is:

A joint construction for pipe having a diameter of at least about 16 inches and useful in pipe lines where transient liquid pressure peaks within the line tend to spread the joint pipe ends apart, said joint comprising the following: a steel spigot having a substantially cylindrical outer surface with the end portion thereof provided with an annular shoulder portion extending outwardly from the projection of the cylindrical outer surface, said shoulder having one side thereof inward from the free spigot end facing away from the free spigot end and said shoulder being provided with an annular gasket groove between said one shoulder side and free spigot end, a gasket in said groove with the outer gasket surface being available for cooperation with an opposed cylindrical surface, a cooperating bell construction, said bell construction including the following: a steel bell rigidly secured to the pipe proper and having a cylindrical portion extending beyond the free end of the pipe wall, said cylindrical portion having an inside diameter slightly larger than the outside diameter of the spigot shoulder so that the spigot shoulder and gasket can be disposed within the cylindrical bell portion, said cylindrical bell portion having sufficient length so that said spigot shoulder and gasket can remain within the bell cylinder in sealing relation in spite of relative pipe movement longitudinally of the pipes over a predetermined range, said bell terminating in a conventional outwardly flaring pipe bell end, a steel ring construction rigidly secured around the outside of the flaring pipe bell end, said steel ring extending beyond the pipe bell end and having the inner surface of the free end portion of the steel ring construction shaped to provide an outer ring bell, said outer ring bell having its shortest inside diameter substantially equal to the inside diameter of the pipe bell cylinder to permit the spigot and the spigot shoulder portion to be inserted into the steel ring construction and thence into the steel ring construction and thence into the pipe bell cylinder, said steel ring construction and thence into the pipe bell cylinder, said steel ring construction providing a free annular space between the small end of the steel ring construction outer bell and the end of the flaring bell portion of the pipe bell, the steel ring construction surrounding said annular space having an inside diameter substantially greater than the inside diameter of the pipe bell cylinder, a steel split locking ring disposed within said annular space and having ends bent outwardly and extending through a gap in said first named steel ring construction to be accessible from outside of the joint, said annular space being larger, as measured radially from the cylinder axis, than the thickness of the split locking ring so that said split locking ring can be expanded or contracted by manipulating the bent ends therof, said split locking ring when expanded having an inside diameter which is at least as large as the inside diameter of the cylindrical part of the pipe bell whereby the spigot can be accommodated during assembly, said split locking ring thickness being great enough so that when contracted, the outer diameter of the split locking ring will be larger than the smallest inside diameter of both bell structures, said first named steel ring construction being shaped to provide a shoulder facing the free flaring end of the pipe bell so that when the joint is assembled and the split locking ring is contracted, relative pipe joint opening movement will be limited by the split locking ring being caught between the side of the spigot shoulder and the shoulder provided by the first named steel ring construction, said joint providing sealing throughout the range of relative pipe movement and providing steel-to-steel contact for limiting the maximum movement of the spigot out of the bell.

References Cited by the Examiner

UNITED STATES PATENTS

| 1,524,296 | 1/25 | Field | 285—321 |
| 1,652,418 | 12/27 | Sherrerd | 285—288 |
| 2,576,012 | 11/51 | Gurck | 285—288 |

FOREIGN PATENTS

| 447,603 | 3/48 | Canada. |
| 768,416 | 2/57 | Great Britain. |

CARL W. TOMLIN, *Primary Examiner.*